June 28, 1960 — M. W. GREENE ET AL — 2,942,943
PROCESS FOR SEPARATING IODINE-132 FROM FISSION PRODUCTS
Filed April 30, 1958
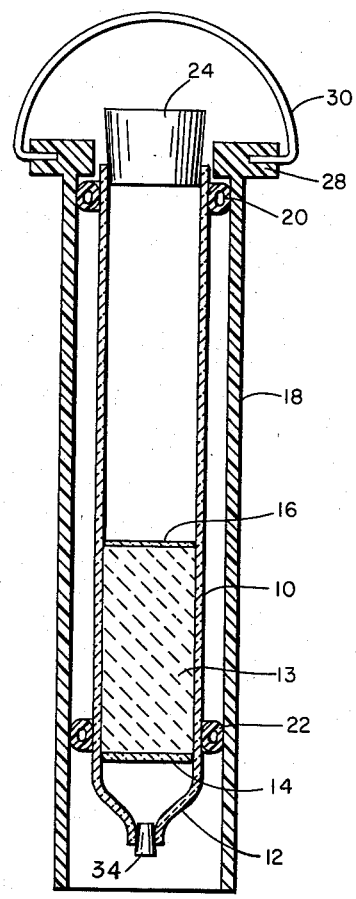
INVENTOR.
WALTER D. TUCKER
GEORGE SAMOS
MARGARET W. GREENE
BY 
United States Patent Office

2,942,943
Patented June 28, 1960

2,942,943

PROCESS FOR SEPARATING IODINE-132 FROM FISSION PRODUCTS

Margaret W. Greene, Bellport, N.Y., George Samos, Lutherville, Md., and Walter D. Tucker, Sayville, N.Y., assignors to the United States of America as represented by the United States Atomic Energy Commission Filed Apr. 30, 1958, Ser. No. 732,108

8 Claims. (Cl. 23—85)

This invention relates to a process for isolating individual isotopes from fission products, i.e. those isotopes produced in the exposure of fissionable material to neutrons. More particularly, it relates to a novel method of recovering iodine-132 in substantially pure form and means adapted to carry out the method of the invention.

Radioactive iodine has been used in the medical and biological fields as a tracer for investigative and diagnostic purposes and in some cases as a therapeutic agent. For many clinical and therapeutic uses, a short-lived iodine isotope is particularly desirable. Thus a short-lived isotope decays rapidly after it is no longer needed to minimize any damage to healthy tissue. Further, within a relatively short period of time a second test or treatment can be made. A study of the known radioactive isotopes indicates that iodine-132 with a half-life of about 2.4 hours is well suited for many applications of this type.

The use of a radioactive isotope having a relatively short half-life presents certain problems. Because its half-life is so short, it cannot be packaged in a conventional manner and shipped any considerable distance without losing an excessive proportion of its activity. It is, therefore, an object of the present invention to provide a novel source of iodine-132 which can be safely transported to a relatively remote distance and conveniently used at its destination. Another object of this invention is to provide an improved means of making a short-lived isotope, such as iodine-132, readily available for medical, biological and other uses. Still another object of the invention is to provide a container to serve as a source of iodine-132 and as means for controlling the rate at which the iodine-132 is delivered at the point of use. A further object of the invention is to reduce the amount of labor, materials and time employed in the separation of tellurium and iodine. Another object of the invention is to provide a source of carrier-free iodine-132. These and other objects and advantages of the present invention can best be understood by consideration of the following description taken in conjunction with the accompanying drawing which illustrates a "generator" adapted to contain a source of radioactive iodine capable of use in accordance with the method of the invention. The drawing is a schematic vertical section through the generator and illustrating the source of iodine-132 and the means used to package it.

In general, the objects of the present invention can be achieved by adsorbing tellurium-132, which is the radioactive parent of iodine-132, on a finely divided mass of a chromatographic grade of alumina, allowing a period of time to elapse to permit formation of a quantity of iodine-132 and thereafter separating the thus formed iodine-132 from the alumina. The iodine-132 can be selectively separated from the tellurium as will be seen hereinafter.

It has been known for some time that ion exchange resins exhibit pronounced and selective adsorption properties for a large number of ionic substances. None of the known ion exchange resins tested were found to be at all effective to separate tellurium and iodine from each other in an efficient and rapid manner in accordance with the objects of our invention. We have discovered that finely divided particles of alumina have the capacity to selectively adsorb tellurium and iodine from solutions containing a diverse variety of ions. The term "adsorption" is utilized in referring to removal of components from solutions by a solid material. Certain other chemically unreactive refractory oxides, such as zirconia, titania and ceria, may also be used to separate tellurium and iodine in accordance with the method of our invention.

In accordance with the method of our invention, the radioactive tellurium is used in aqueous solution. In order to insure adsorption on the alumina, the tellurium in the solution should be in its anionic form. The bed of alumina should contain enough alumina to insure that its capacity is sufficient to allow complete adsorption of the tellurium. The alumina should be finely divided to present a maximum surface to the solution, care being taken to keep the particle size from being so small as to cause the bed of alumina to become impervious to the solution. A particle size corresponding to U.S. mesh 80–200 has been found satisfactory. For separation, the solution is permitted to seep under gravity through the alumina bed. Wash liquors and eluting solutions are used as indicated hereinafter.

It has been found that aqueous basic solutions are suitable for elution of the tellurium and iodine from the alumina. The iodine is removed with an eluant of a particular alkaline pH.

The following example illustrates the process of our invention as it applies to the separation of iodine-132 from a solution of fission products. However, it is apparent that the method can be readily adapted to separate tellurium and iodine in their non-radioactive form.

*Example 1*

Tellurium-132, which has a half-life of 77 hours, occurs as one of the fission products resulting from the irradiation of natural uranium with thermal neutrons.

Twenty milligrams of uranium foil was irradiated for 14 days in the nuclear reactor at the Brookhaven National Laboratory for a total integrated neutron flux of approximately $4 \times 10^{18}$ nvt. After three days' cooling to allow the shorter-lived radioactive fission products to decay, the sample was dissolved in concentrated nitric acid and subsequently diluted with water to form a solution approximately one molar in nitric acid. This solution, containing uranium and fission products, was then allowed to flow through a column containing about 40 grams of a chromatographic grade of alumina (obtained from the Fisher Scientific Company). It was found that only tellurium and molybdenum were retained on the column, while the uranium and other fission products passed through the column and were not adsorbed thereon. The tellurium on the column was predominantly tellurium-132, and the molybdenum was molybdenum-99. The column was washed with a dilute aqueous solution of nitric acid to remove any residual uranium and other fission products and thereafter washed with a dilute solution of ammonium hydroxide to neutralize any acid retained in the column.

It was found that the molybdenum could be selectively removed from the column by passing a concentrated solution of ammonium hydroxide therethrough; 300–500 milliliters of concentrated ammonium hydroxide was sufficient to remove substantially all of the molybdenum from the alumina bed. Tellurium-132 was removed from the bed by washing with about 100 milliliters of about 2–4 molar sodium hydroxide. The resultant solution contained carrier-free tellurium dissolved therein as sodium tellurite, and this solution formed the initial feed solution for the iodine generator.

In order to form a packaged source of iodine-132, the tellurite solution was passed through an iodine "generator," which is illustrated in the drawing. Referring to the drawing, there is shown an open-ended cylindrical column 10 made of glass or other chemically inert material. The column 10 acts as a container for a bed 13 of alumina which is located below the mid-section of column 10. The lower end of the column is narrowed to form a conduit 12 of smaller diameter than the column 10. Conduit 12 acts as a drain for removing the effluent passing from bed 13. Near the bottom of column 10, there is a porous disc 14 which supports the alumina. The disc 14 is secured to the walls of column 10 such as by a press fit. A similar porous disc 16 is secured on top of the alumina bed 13 against the walls of column 10 to retain it in position and thus prevent it from being disturbed during use or shipping. The column 10 is positioned in a tubular container 18 of slightly greater internal diameter than the external diameter of column 10, column 10 being positioned concentrically therein by two retaining rings 20 and 22, each made of a resilient material, such as rubber tubing, to protect the column from shock during handling. The upper end of container 18 is provided with a relatively heavy flange 28. A loop handle or bail 30 is mounted in the flange 28 so that the generator may be conveniently carried.

In order to load the generator, the feed solution containing sodium tellurite and having a desired amount of tellurium-132 is adjusted to a pH which should be in the range 8 to about 10.5. More strongly acidic or basic solutions of sodium tellurite tend to dissolve the alumina. More strongly basic solutions also result in less tellurium values being adsorbed on the alumina. In strongly acid solutions the iodine-132 produced by the radioactive decay of the tellurium is converted to its elemental form. Since elemental iodine is readily volatile, it can pass off into the atmosphere and thus constitute a radiation hazard. The pH-adjusted solution is then allowed to flow slowly through the alumina. After the tellurium solution has been added, the column is washed with a dilute ammonia solution to remove any iodine-131 which has accumulated as a result of the radioactive decay of tellurium-131. After the column has been drained a stopper 24 is inserted in the upper end of column 10; conduit 12 is also plugged by a stopper 34. The generator is then ready for shipment. The generator may be packed in any conventional container such as a corrugated cardboard box.

The generator is shipped in an essentially dry state, that is, little water is retained in the alumina during shipment. This is a decided advantage since, in the event of a severe accident during shipment, there would be a minimum of radioactive material dispersed.

When it is desired to remove iodine-132 values from the generator for use, it may be easily "milked" to obtain controllable quantities of iodine-132 values therefrom. The removal is then simply carried out by passing a measured volume of a dilute basic solution, such as .001 to .1 molar solution of aqueous ammonia, into the top of column 10. The eluate passing from the generator is collected and constitutes the product iodine-132 solution. Less than 5 minutes is required to complete the collection of the iodine-132. The product solution is substantially free of tellurium contamination, containing less than about .001% of the tellurium on the column. When using other refractory oxides, i.e. zirconia as the adsorbent, eluting solutions containing a lower alcohol such as ethanol may also be used to remove the iodine from the oxide bed.

While the method as described has been carried out using trace amounts of tellurium, it will be apparent that the method is equally useful for obtaining a substantially pure iodine-132 product when larger than trace amounts of tellurium are used. In that case, however, the amount of tellurium in the product solution will tend to be greater as the amount of tellurium in the feed solution is increased. However, in cases where more than trace amounts of tellurium are used, the use of about 100 milligrams of alumina for each milligram of tellurium will insure substantially complete adsorption of tellurium. If insufficient alumina is used, the tellurium will wash out during iodine removal and increase the tellurium contamination of the product solution. In addition, a small amount of a longer-lived iodine radio-isotope, iodine-131, will be found in the product solution. However, the percentage of iodine-131 can be minimized by eluting to remove the longer-lived iodine-131 that has accumulated, and then allowing the iodine-132 to grow in amount for only that length of time required to give the desired amount of iodine-132 activity.

It will thus be seen that we provide a simple and yet highly efficient method of obtaining a carrier-free iodine-132 product. The method of obtaining the desired radioactive product involves a very simple procdure, and the generator apparatus for carrying out the method may be easily constructed from readily available materials.

It is of interest to note that the presence of as little as 1 microgram of tellurium in the iodine solution causes an annoying condition known as "garlic breath" to patients who have been administered such solutions. This condition has been so obnoxious that patients have refused to continue tests or treatment with iodine-132. However, by the present method it is possible to reduce the tellurium contamination to such a level as to avoid this condition.

Since many embodiments might be made in the present invention and since many changes might be made in the embodiment described, it is to be understood that the foregoing description is to be interpreted as illustrative only and not in a limiting sense.

We claim:

1. A method of producing radioactive iodine-132 which comprises passing tellurium-132 as a tellurous acid salt in aqueous solution through a bed of finely divided alumina to absorb tellurium-132 values thereon, allowing a period of time to permit iodine-132 formed by decay of said tellurium-132 to accumulate on said alumina, eluting iodine-132 values from said alumina with a dilute aqueous basic solution and collecting the eluate as the produce containing iodine-132.

2. The method according to claim 1 wherein the tellurium salt is sodium tellurite.

3. A method of producing a radioactive, pure iodine-132 solution which comprises flowing an aqueous solution containing a tellurite salt of tellurium-132 through a column of finely divided alumina to adsorb tellurium-132 values thereon, selectively eluting iodine-132 values formed from the radioactive decay of said tellurium-132 with a dilute aqueous solution having a pH in the range 9 to 11 and thereafter collecting the eluate as the desired product solution.

4. A method of producing a radioactive pure iodine-132 solution which comprises flowing an aqueous solution containing a tellurite salt of tellurium-132 through a column of finely divided alumina to adsorb tellurium-132 values thereon and thereafter selectively eluting iodine-132 values formed from the radioactive decay of tellurium-132 with a volume of .001 to .01 molar aqueous solution of ammonium hydroxide and thereafter collecting the eluate as the desired product solution.

5. A method for obtaining radioactive carrier-free iodine product which comprises forming a solution of an isotope of tellurium that decays by beta particle emission, as its tellurite ion, passing said tellurite solution through a mass of finely divided chromatographic grade alumina to adsorb the tellurium values thereon and thereafter collecting iodine values, the radioactive decay product of said tellurium, by washing the contacted alumina with a dilute basic solution and collecting the eluate as the desired product.

6. A method of producing radioactive iodine-132 which comprises passing tellurium-132 as a tellurous acid salt in aqueous solution through a bed of finely divided alumina to adsorb tellurium-132 values thereon, passing a dilute aqueous basic solution through the said finely divided aluminum bed thereby eluting iodine-132 values formed by decay of said tellurium-132 and collecting the eluate product containing iodine 132.

7. The method according to claim 6 wherein the tellurium salt is sodium tellurite.

8. A method of separating the elements tellurium and iodine from each other which comprises forming a solution containing said elements in ionic form, wherein the tellurium exists in the solution as the tellurite ion, contacting said solution with a finely divided metal oxide selected from the group consisting of alumina, zirconia, titania, ceria, to selectively adsorb the tellurium values thereon and thereafter passing a volume of .001 to .01 molar solution of ammonium hydroxide through said oxide to selectively elute the iodine-132 values from said oxide and thereafter passing sodium hydroxide in the range of 2 to 4 molar over said oxide eluting tellurium.

References Cited in the file of this patent

UNITED STATES PATENTS

| | | |
|---|---|---|
| 1,059,531 | Ebler | Apr. 22, 1913 |
| 2,728,633 | Arden et al. | Dec. 27, 1955 |
| 2,819,144 | Seaborg et al. | Jan. 7, 1958 |
| 2,849,282 | Boyd | Aug. 26, 1958 |
| 2,855,269 | Boyd et al. | Oct. 7, 1958 |
| 2,869,983 | Gruen | Jan. 20, 1959 |

OTHER REFERENCES

Flagg et al.: "Industrial and Engineering Chemistry," Analytical Edition, vol. 13, No. 5, pages 341–345, May 15, 1941.